US012809092B2

(12) United States Patent
Inoue et al.

(10) Patent No.: US 12,809,092 B2
(45) Date of Patent: Nov. 24, 2026

(54) METHOD OF MANUFACTURING NANOFIBER CAVITY FOR QUANTUM COMPUTING AND DEVICE

(71) Applicant: Nanofiber Quantum Technologies, Inc., Tokyo (JP)

(72) Inventors: Ryotaro Inoue, Tokyo (JP); Takao Aoki, Tokyo (JP); Shinya Kato, Tokyo (JP); Akihisa Goban, Tokyo (JP)

(73) Assignee: Nanofiber Quantum Technologies, Inc., Tokyo (JP)

( * ) Notice: Subject to any disclaimer, the term of this patent is extended or adjusted under 35 U.S.C. 154(b) by 564 days.

(21) Appl. No.: 18/353,634

(22) Filed: Jul. 17, 2023

(65) Prior Publication Data

US 2025/0028121 A1 Jan. 23, 2025

(51) Int. Cl.
*G02B 6/34* (2006.01)
*G02B 6/44* (2006.01)

(52) U.S. Cl.
CPC ............. *G02B 6/34* (2013.01); *G02B 6/4415* (2013.01)

(58) Field of Classification Search
None
See application file for complete search history.

(56) References Cited

U.S. PATENT DOCUMENTS

2002/0114553 A1 8/2002 Mead et al.
2007/0258673 A1* 11/2007 El-Sherif ........... G02B 6/02195 385/10
2008/0037935 A1* 2/2008 Park ................... G02B 6/02138 385/39
2015/0219843 A1 8/2015 Westbrook
2019/0127392 A1* 5/2019 Dayan ................ G02B 6/02052
(Continued)

FOREIGN PATENT DOCUMENTS

CN 111239888 A * 6/2020 ......... G02B 6/02057
CN 115128729 A * 9/2022 ............. G01H 9/004
CN 115615957 A * 1/2023 ............. G01N 21/45
(Continued)

OTHER PUBLICATIONS

Shinya Kato et al. "Single-frequency fiber Fabry-Perot Brillouin laser", Optics Letters, Oct. 1, 2022, p. 5000-5003 vol. 47, No. 19.
(Continued)

*Primary Examiner* — Chris H Chu
(74) *Attorney, Agent, or Firm* — Ogawa P.C.

(57) ABSTRACT

In an example, the present invention provides a method of manufacturing a polarization-degenerate fiber Bragg grating nanofiber cavity for quantum computing or quantum repeater. The method includes transmitting electromagnetic radiation characterized by a wavelength of 150 nm to 400 nm and longer through a pattern of a phase shift mask to diffract the electromagnetic radiation to form an interference pattern. The pattern is to be illuminated onto a core of a first end of a fiber optical cable region. In an example, the method forms a fiber Bragg grating onto the core of fiber optical cable region by changing a refractive index of the core of fiber optical cable region using the electromagnetic radiation while rotating the fiber optical cable about an axis defined along a length of the fiber optical cable region.

12 Claims, 5 Drawing Sheets

(56) References Cited

U.S. PATENT DOCUMENTS

2022/0013977 A1* 1/2022 Zhou .................... H01S 5/1021

FOREIGN PATENT DOCUMENTS

| | | | | |
|---|---|---|---|---|
| EP | 0978738 A1 | 2/2000 | | |
| WO | 02095466 A1 | 11/2002 | | |
| WO | WO-2022009950 A1 * | 1/2022 | .......... | G02B 6/3536 |

OTHER PUBLICATIONS

Maxime Joos et al. "Complete polarization control for a nanofiber waveguide using the scattering properties", Optics Express, Jun. 24, 2019, p. 18818-18830, vol. 27, No. 13.

Search Report and Examination from related application No. GB2410140.4 mailed on Dec. 19, 2024.

Harjot Singh et al., "Optical Transparency Induced by a Largely Purcell Enhanced Quantum Dot in a Polarization-Degenerate Cavity", Nano Letters, American Chemical Society, No. 22, Sep. 21, 2022, pp. 7959-7964, https://doi.org/10.1021/acs.nanolett.2c03098.

* cited by examiner

METHOD OF MANUFACTURING NANOFIBER CAVITY FOR QUANTUM COMPUTING AND DEVICE

CROSS-REFERENCE TO RELATED APPLICATIONS

N/A

BACKGROUND OF INVENTION

Various techniques have been developed for making quantum computers. Superconducting qubits have been implemented using superconducting circuits that can exhibit quantum behavior. Such superconducting circuits were typically made using thin films of superconducting materials and require extremely low temperatures (close to absolute zero) for operation. Superconducting qubits have demonstrated relatively long coherence times, allowing for complex computations. They can be fabricated using existing semiconductor fabrication techniques. Unfortunately, the low-temperature requirement and the need for complex cooling systems make them more challenging to operate. Qubit coherence can be sensitive to environmental noise, limiting scalability.

Another technique involves trapped ion qubits. Such trapped ion qubits use individual ions trapped in an electromagnetic field to store and manipulate quantum information.

Ions are manipulated using laser beams to create a qubit's basic operations. Trapped ion qubits have shown exceptional coherence properties and have demonstrated long qubit lifetimes. They can be individually controlled with high precision. Scaling up trapped ion systems, however, have been difficult due to the complexity of individually manipulating ions. Additionally, the need for high-quality vacuum systems and precise laser control adds to the complexity and cost of implementation.

Yet another technique involves topological qubits, which rely on manipulating quasi-particles called "anyons." Anyons emerge in exotic states of matter, such as topological superconductors.

Anyons store and process quantum information in a topologically protected manner, making them less susceptible to errors caused by environmental noise. Topological qubits have been robust against certain types of errors, making them potentially useful for error-resistant quantum computing. Drawbacks, however, exist. That is, topological qubits are still in the early stages of development, and practical implementations face challenges related to the creation and control of topological states. Realizing the required exotic materials and stable conditions is technically demanding.

Moreover, photonic qubits have been explored. Such photonic qubits use photons (i.e., particles of light) to encode and manipulate quantum information. Quantum gates are implemented using optical elements such as beam splitters, wave plates, and detectors. Photonic qubits can easily be manipulated with existing optical technologies. They are inherently immune to certain types of noise and can be transmitted over long distances. Unfortunately, photonic qubits struggle with efficient qubit-photon interaction and are challenging to create, store, and measure on-demand. Integrating large numbers of qubits is currently difficult.

Each of the aforementioned approachs has its own set of advantages and challenges, and the field of quantum computing is actively exploring these technologies. These techniques, unfortunately, have drawbacks. The drawbacks include difficulty in scalability, reliability, and qubit coherence.

SUMMARY OF INVENTION

According to the present invention, techniques generally related to quantum computing and quantum repeater are provided. In particular, the present invention provides a manufacturing method and resulting device for a nanofiber based quantum computing system including an optical cavity configured with a pair of Bragg Gratings. Merely by way of example, the invention can be applied to a variety of applications such as cryptography, drug discovery, optimization, machine learning and artificial intelligence, finance, weather forecasting, chemical, mechanical, electrical, civil, nuclear fusion and fission, economics, materials, and any other complex human or non-human matters.

In an example, the present invention provides a method of manufacturing a polarization-degenerate fiber Bragg grating nanofiber cavity for quantum computing or quantum repeater. The method includes transmitting electromagnetic radiation characterized by a wavelength of 150 nm to 400 nm and longer through a pattern of a phase shift mask to diffract the electromagnetic radiation to form an interference pattern. The pattern is to be illuminated onto a core of a first end of a fiber optical cable region. In an example, the method includes causing a formation of a first fiber Bragg grating onto the core of fiber optical cable region by changing a refractive index of the core of fiber optical cable region using the electromagnetic radiation while rotating the fiber optical cable about an axis defined along a length of the fiber optical cable region to form the first fiber Bragg grating configured with a plurality of azimuthally symmetric patterns of a plurality of refractive index modulations 360 Degrees in angle around a core of the fiber optical cable and along a longitudinal region normal to a cross-section of the fiber optical cable region. The method includes forming a second fiber Bragg grating at a second end of the fiber optical cable region and the second fiber Bragg grating configured with a plurality of azimuthally symmetric patterns of a plurality of refractive index modulations 360 Degrees in angle around a core of the fiber optical cable. In an example, the second fiber Bragg grating is formed using similar radiation through the phase shift mask.

In yet another example, the invention provides a related system, and other methods, including forming a first fiber Bragg grating at one spatial region of a fiber optical cable, and rotating the cable by a predetermined amount and forming a second fiber Bragg grating.

Depending upon the example, the present invention can achieve one or more of these benefits and/or advantages. In an example, the present invention provides an efficient quantum computing system based upon a novel nanofiber based optical cavity. That is, the present invention provides a quantum computing device using a nanofiber region configured with a pair of reflectors to form a cavity for a quantum computing and repeater. In an example, the device uses conventional optical techniques, and is compact and efficient. In an example, the present invention offers advantages of generating manufacturable optical cavities that are reliable and efficient. These and other benefits and/or advantages are achievable with the present device and related methods. Further details of these benefits and/or advantages can be found throughout the present specification and more particularly below.

BRIEF DESCRIPTION OF DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE EXAMPLES

Figure 1:
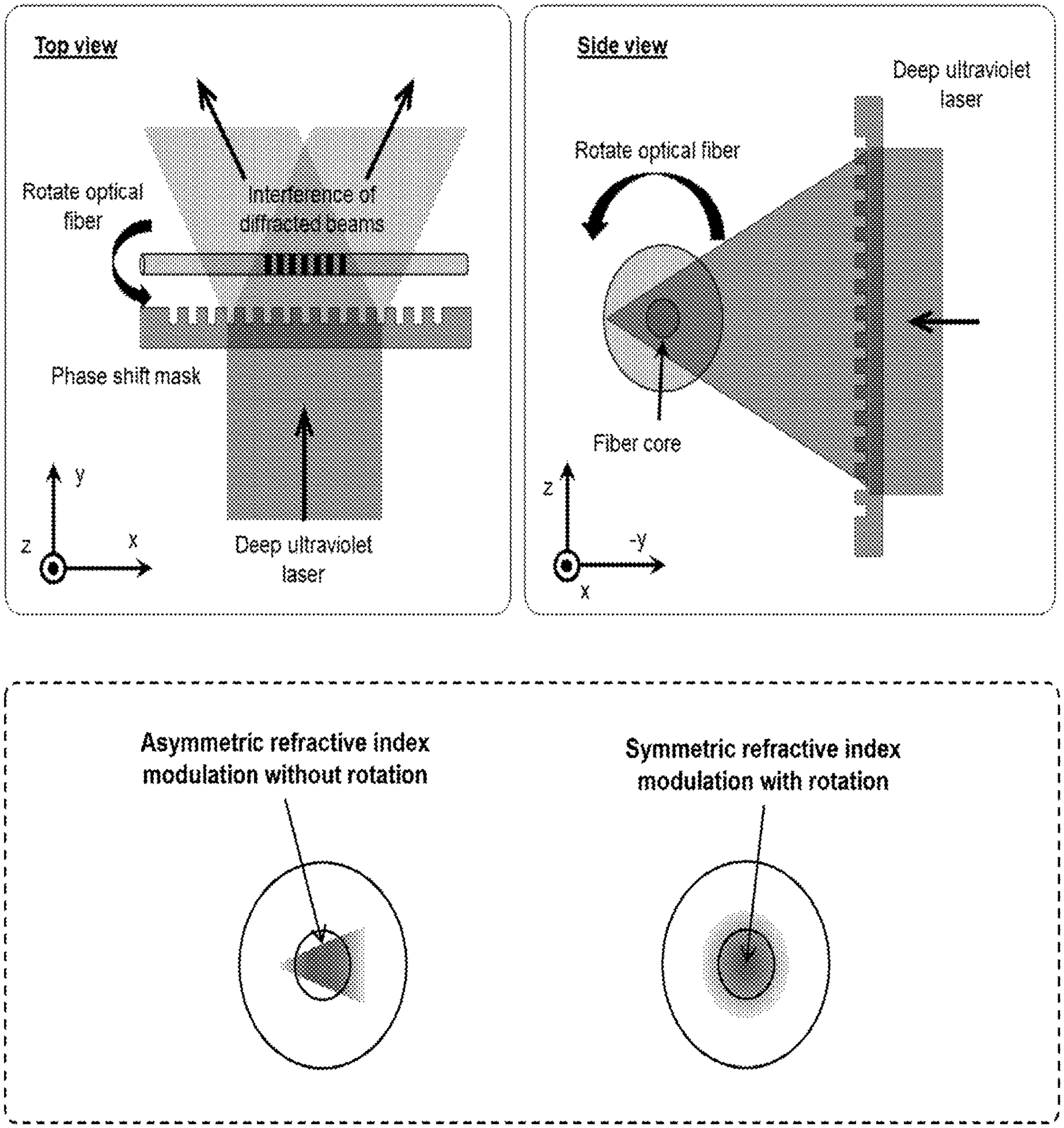
FIG. 1 is a simplified diagram illustrating a method for fabricating azimuthally symmetric fiber Bragg grating along the fiber axis in an example of the present invention.

The present invention provides techniques generally related to quantum computing and methods of manufacture. In particular, the present invention provides a manufacturing method and resulting device for a nanofiber based quantum computing system including an optical cavity configured with a pair of Bragg Gratings. Merely by way of example, the invention can be applied to a variety of applications such as cryptography, drug discovery, optimization, machine learning and artificial intelligence, finance, weather forecasting, chemical, mechanical, electrical, civil, nuclear fusion and fission, economics, materials, and any other complex human or non-human matters. In an exemplary example, the present invention provides a method of manufacture of a polarization degenerate cavity for quantum computing.

As background, a polarization degenerate cavity is an optical cavity that can support arbitrary polarization states of light without causing them to experience different resonant frequencies or other differing properties. That is, the cavity has a structure that allows light waves with different orientations of their electric fields to resonate at the same frequency. As background, conventional optical cavities have been designed in such a way that they preferentially support one specific polarization state or inevitably support only one specific polarization since mirrors may have polarization dependence due to the impurities of the material, anisotropic stress induced by the surrounding structures and other types of sources causing the polarization dependence. However, according to the present example, it is beneficial for the cavity to be able to support arbitrary polarization states without discrimination. In a polarization degenerate cavity, light waves with different polarizations (e.g., horizontal and vertical, or right-handed circular and left-handed circular) can resonate with the same efficiency and at the same frequency. A polarization degenerate cavity ensures that variations in the polarization state do not adversely affect the performance of the optical system by causing, for example, differences in resonant frequencies for different polarizations.

Polarization degenerate cavities have been important in various fields, particularly in optics and photonics, due to their ability to support arbitrary polarization states simultaneously. In lasers, a polarization degenerate cavity can improve the output power and stability. The ability to support arbitrary polarizations can be beneficial for achieving higher efficiency and more stable laser operation. In optical fiber communications, the ability to manipulate the polarization state of light is crucial. Polarization degenerate cavities can be employed in devices like modulators, where the light's polarization can be controlled to encode information. By utilizing different polarization states, it is possible to increase the capacity of communication channels. This is done by multiplexing the signals in different polarizations, allowing for more data to be transmitted over the same medium without increasing the bandwidth. In optical sensors, the ability to support and analyze different polarization states can enhance the sensitivity and specificity of the sensor. For instance, by examining changes in the polarization states, one can detect changes in the physical or chemical properties of the material being analyzed. Polarization degenerate cavities can be used in spectroscopy and microscopy to study the properties of materials. By examining how a material affects the polarization state of light, one can gain insights into its structure and composition.

Polarization degenerate cavities often have compact structures, which make them ideal for integration into small-footprint photonic devices. This is particularly important in the context of increasing demands for miniaturization and integration in modern electronics and photonics. When a cavity is polarization degenerate, it is often more robust to external perturbations that could otherwise cause a drift in the polarization state. This makes such cavities well-suited for applications where stability and reliability are important. In quantum technologies, polarization degenerate cavities are desirable for manipulating and storing quantum information. They can help in generating atom-photon entanglement and entangled photon pairs, which are crucial for quantum communication and computing. Accordingly, degenerate cavities are an important component in modern optics, photonics and quantum technologies due to their ability to handle arbitrary polarization states, which is desirable for enhancing the performance, capacity, and functionality of various systems and devices.

However, creating a polarization-degenerate high-finesse fiber Bragg grating cavity is challenging due to several factors that must be carefully controlled to ensure both high finesse and polarization degeneracy. Here are some of the reasons why this is difficult:

Birefringence: Most optical materials are naturally birefringent to some degree, meaning that they have different refractive indices for different polarizations of light. Even small amounts of birefringence can cause the cavity to have different resonant frequencies for different polarizations, which is the opposite of what is needed for polarization degeneracy.

Fiber Bragg Grating (FBG) mirror: The low-loss FBG-based mirrors of the cavity are important to achieving high finesse. However, the reflectivity of FBG can also be polarization-dependent based on a standard fabrication procedure. Creating FBGs that have both high reflectivity and are not polarization-dependent is challenging.

Stress-Induced Birefringence: The mechanical stress, either from mounting or from beding the fiber, can induce birefringence in the FBG. This stress-induced birefringence can cause different polarizations to resonate at different frequencies.

Complexity in Design and Fabrication: To achieve polarization degeneracy, a high level of control over the material properties, FBG fabrication, and proper fiber mounting is required. This complexity in design and fabrication can make it difficult and costly to achieve polarization-degenerate high-finesse cavities.

Due to these challenges, creating polarization-degenerate high-finesse cavities often requires careful design, precision fabrication, and meticulous alignment and stabilization.

These and other challenges have been overcome with the present method and system, as will be further described below.

The fiber-based cavity is composed of two Fiber Bragg Grating (FBG) which acts as high reflectors to from the cavity modes. FBG is a passive optical component that is used for filtering and reflecting specific wavelengths of light. FBG is made by introducing a periodic variation in the refractive index within a small section of an optical fiber. An optical fiber has a core surrounded by a cladding, both made of dielectric materials, but with slightly different refractive indices. In the case of a Fiber Bragg Grating, a series of periodic refractive index changes is created within the core of the fiber. Various methods, such as exposing the fiber core to an interference pattern of ultraviolet light, which alters the core's refractive index, can be used. When light travels through the optical fiber, most wavelengths pass through unaffected. However, a specific wavelength that meets the Bragg condition will be reflected back. The Bragg condition is met when twice the period of the refractive index variation in the fiber is equal to the wavelength of the light. Mathematically, it's given by λ_B=2*n*Λ, where λ_B is the Bragg wavelength, n is the effective refractive index of the core, and A is the period of the grating. All the other wavelengths that do not meet the Bragg condition continue to travel through the fiber.

FIG. 1 is a simplified diagram illustrating a method for fabricating polarization-degenerate Fiber Bragg Grating (FBG) in an example of the present invention. One common technique for FBG fabrication is the phase mask method. A phase mask, which has a binary pattern of alternating transparent and opaque regions, is designed to diffract light equally and maximally into the plus first and minus first orders. Self-interference between the two orders creates an interference pattern with half the phase mask period, necessary for grating formation. An ultra-violet (UV) laser beam passes through the phase mask, and the resulting interference pattern is imprinted onto the fiber core. A core of the fiber optical cable is composed of a UV-sensitive material commonly used for photosensitization and UV exposure in FBGs is germanium-doped silica glass. The germanium doped fiber has enhanced photosensitivity compared to standard optical fibers, and/or hydrogen loaded fiber, where hydrogen doping is a process often used to enhance the photosensitivity of optical fibers, making them more suitable for the fabrication of Fiber. The germanium-doped silica fiber and/or hydrogen loaded fiber allow for a controlled modification of the refractive index when exposed to UV light. By using a UV laser, the germanium-doped silica fiber is exposed to create a periodic variation in refractive index, forming the Bragg grating structure. This structure reflects a specific wavelength of light known as the Bragg wavelength.

Conventional UV light is focused to a fiber optical cable from one fixed direction such that an intensity distribution at the cross section of the fiber is not azimuthally symmetric along the fiber axis. As a result, the inscribed refractive index modulation is not azimuthally symmetric in the cross section of a fiber optical cable. Therefore, the Bragg wavelength depends on the light polarization in the fiber optical cable since the refractive index modulation of polarization parallel to the UV exposure direction is different from that perpendicular to the UV exposure direction, causing a birefringence for light polarizations indifferent directions, parallel and perpendicular to the propagation direction of UV light.

In the present invention, by rotating the fiber optical cable along the fiber axis during the UV exposure, the averaged intensity of the UV exposure is azimuthally symmetric in the cross section of fiber optical cable. In an example, UV exposure time ranges tens of seconds to 10 minutes and longer.

In an example, the rotation period should be much shorter than the UV exposure time, for instance, much less than half of the exposure time. This fast rotation during the UV exposure allow to create an azimuthally symmetric refractive index modulation in the cross section of the optical fiber cable, leading to a polarization independent FBG where the Bragg wavelength does not depend on the polarization.

Figure 2:
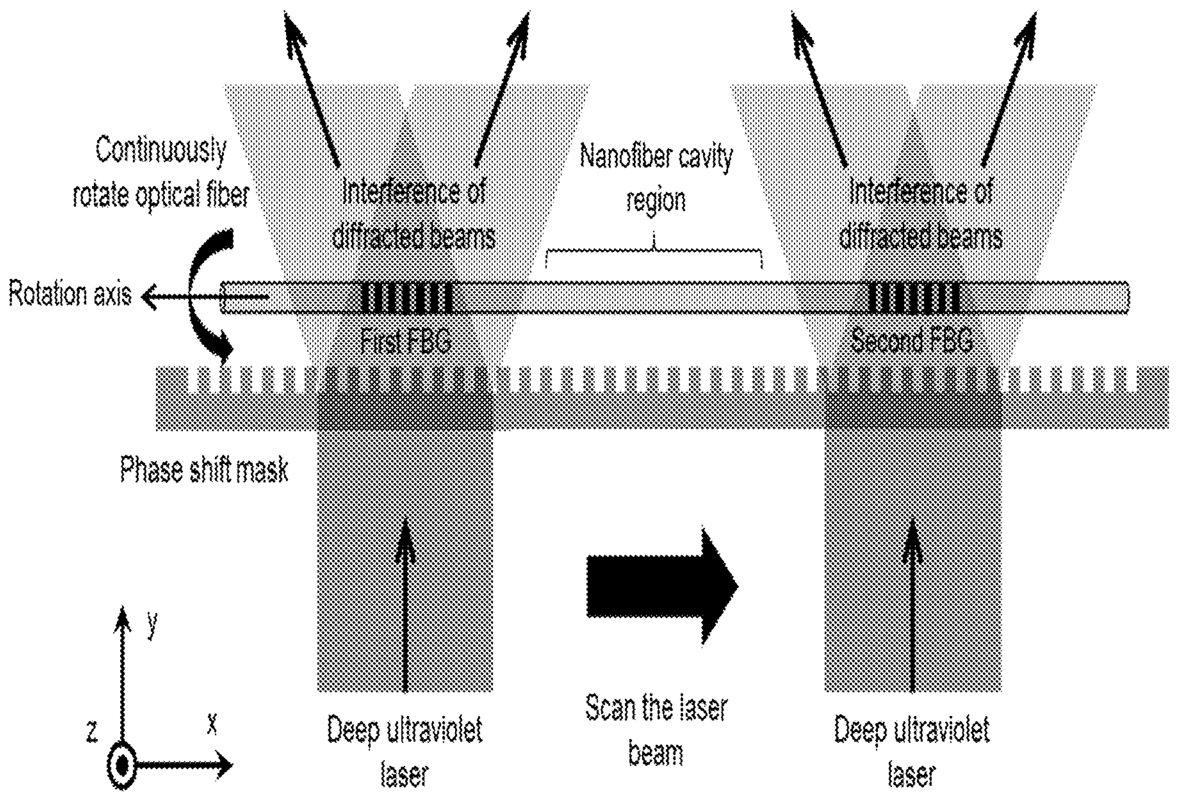
FIG. 2 is a simplified diagram illustrating a method for fabricating a fiber Bragg grating cavity with arbitrary polarization at each cavity mode by rotating a fiber around a fiber axis during both fiber Bragg grating fabrication in an example of the present invention.

FIG. 2 is a simplified diagram illustrating a method for fabricating a polarization-degenerate FBG cavity where two orthogonal light-polarization modes are degenerate in frequency by continuously rotating a fiber around a fiber axis during both FBG fabrications in an example of the present invention. Two FBGs are sequentially fabricated by scanning the UV light source along the fiber axis. After fabricating the first FBG, the UV light source is extinguished by a mechanical shutter, acousto-optic modulator, electro-optic modulator and/or other types of intensity modulators. And then, the UV light source is exposed to the fiber again to fabricate the second FBG. An extinguished time and scanning speed of the UV light source determine a cavity length with the accuracy approaching MHz level in frequency. This scanning method for cavity fabrication enables to create nearly identical FBGs in terms of the Bragg wavelength, the peak reflectivity, and reflection bandwidth, which is essential for generating birefringence-free cavity in addition to the azimuthally symmetric FBG fabrication. Due to an absence of the birefringence of each FBG, resonant frequencies of both cavity modes with two orthogonal polarizations are identical where two orthogonal polarizations are, for instance, two linear polarizations of horizontal and vertical directions, or two circular polarizations where rotation can be right-handed and left-handed, and other pair of orthogonal polarizations.

Figure 3:
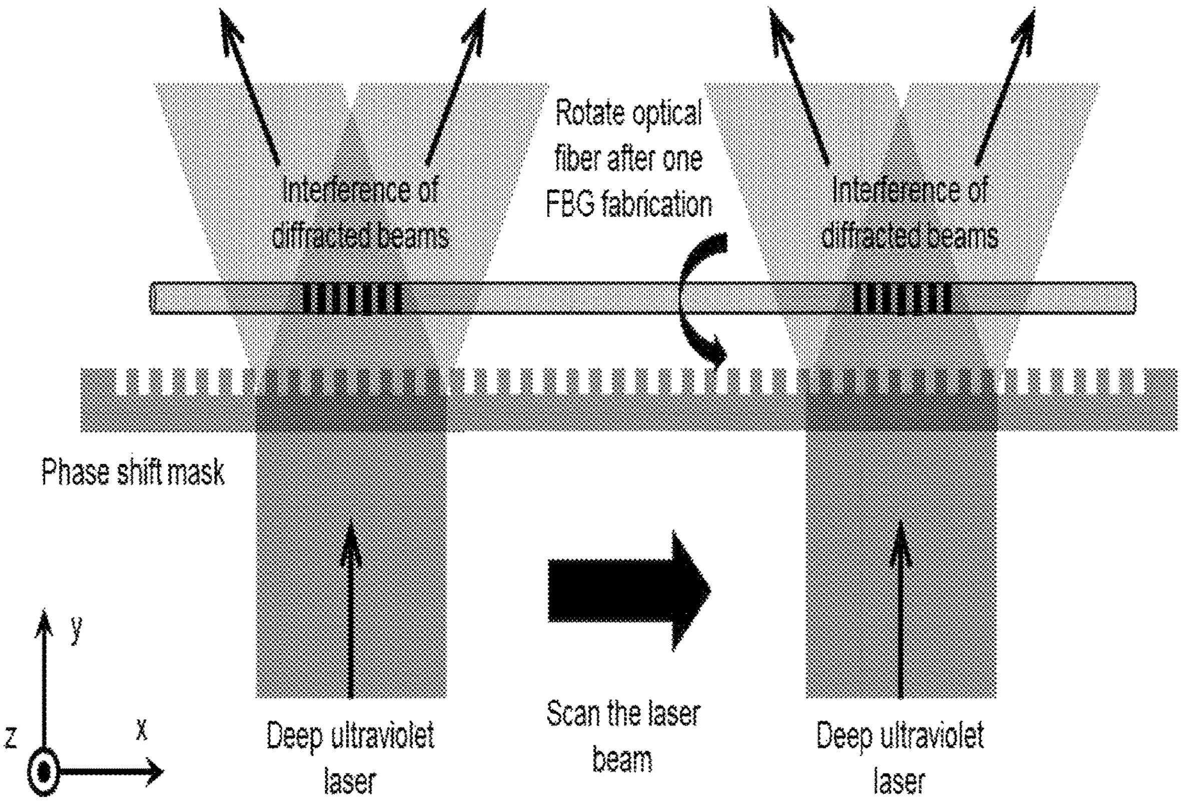
FIG. 3 is a simplified diagram illustrating another method for fabricating a fiber Bragg grating cavity with arbitrary polarization at each cavity mode also fabricated by sequential fiber Bragg grating formation with 90-degree offset angle along a fiber axis in an example of the present invention.

FIG. 3 is a simplified diagram illustrating an alternative method for fabricating a polarization-degenerate FBG cavity where two orthogonal light-polarization modes are degenerate in frequency by sequential fiber Bragg grating formation with 90-degree offset angle along a fiber axis in an example of the present invention. In this method, the first FBG is fabricated without rotating the fiber during the UV exposure, resulting in the birefringent FBG where the refractive index modulation depends on the polarization state. Before fabricating the second FBG, the fiber is rotated by 90 degrees and then the fiber is exposed to the UV light without rotating the fiber such that the birefringence of the second FBG is rotated by 90 degrees as well. Therefore, the birefringence of the first and second FBGs cancel each other out such that the cavity formed by the first and second FBGs supports two orthogonal polarizations at the same resonant frequency.

Figure 4:
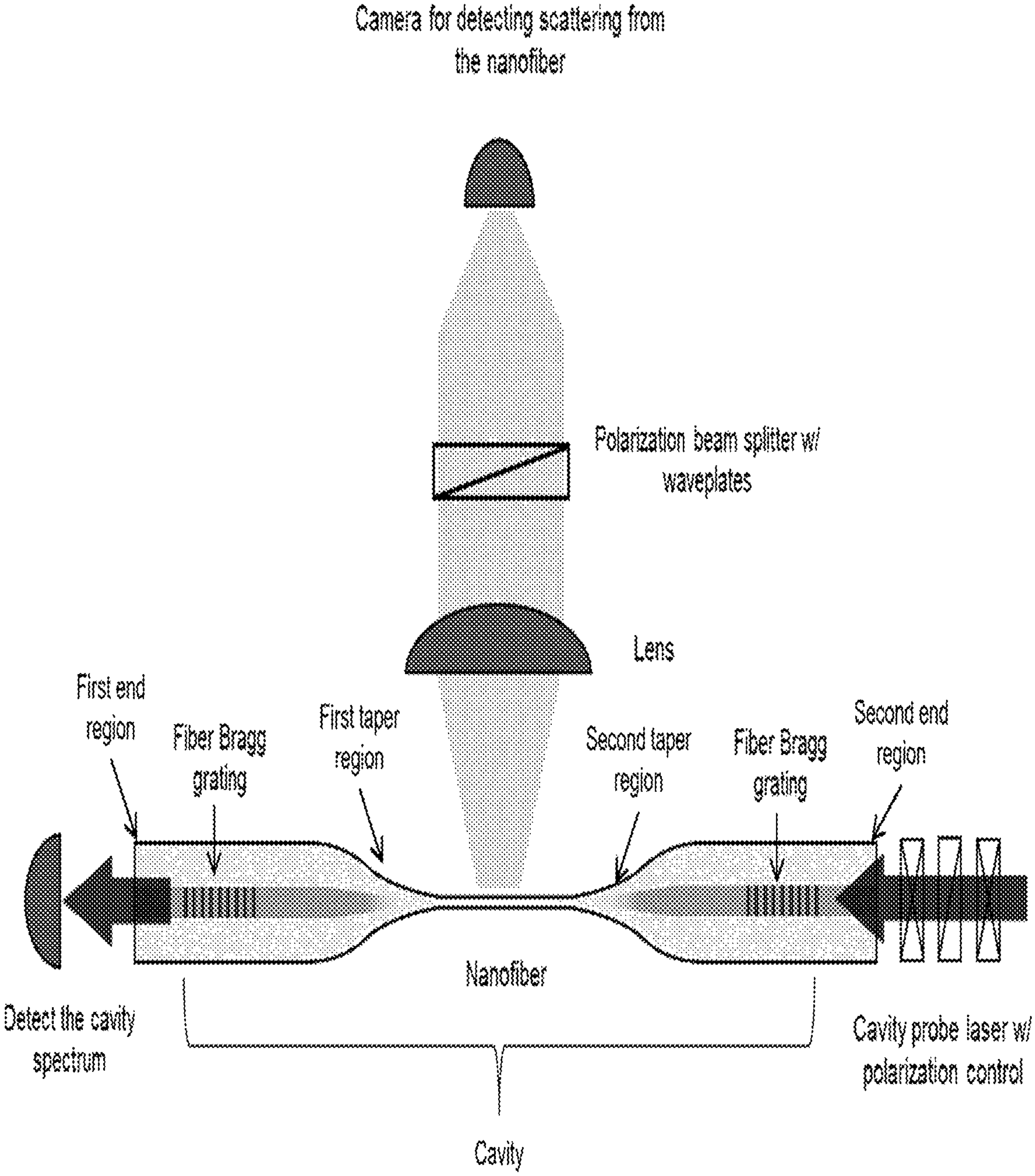
FIG. 4 is a simplified diagram illustrating a method for controlling and characterizing a polarization of a cavity mode by monitoring scattering from a nanofiber region in an example of the present invention.

FIG. 4 is a simplified diagram illustrating a method for characterizing and controlling a polarization state of a cavity mode at the nanofiber region by monitoring scattering from a nanofiber region in an example of the present invention. Characterization involves determining the state of polarization, which can be linear, circular, or elliptical.

Information about the state of polarization of the cavity mode is extracted from the polarization state of scattered light at the nanofiber region. This scattering from an optical nanofiber refers to the phenomenon where light guided within the nanofiber interacts with the fiber's material and structure and is redirected in different directions rather than being guided along the fiber. In nanofibers, this scattering occurs when the size of the impurities and/or defects is much smaller than the wavelength of light such that the polarization state of scattered light represents the local polarization of the cavity mode. Therefore, the polarization state of scattered light is characterized by a polarimeter that usually consists of a set of wave plates and polarizers, and it allows one to measure the Stokes parameters, which fully characterize the state of polarization. To create a desired input state of polarization that is coupled into the cavity, one use polarizers, wave plates and other types of polarization sensitive optics and evaluated by the polarimeter for the scattered light.

Referring to the Figure, in an example, the present invention also includes a quantum computer and repeater cell system. As shown, the system has a fiber optical cable region having a first end region and a second end region. The first end region having a first end, and the second end region having a second end. In an example, the fiber optical cable region comprises a silicon dioxide material with dopant material entity distributed inside of a core region. The system has a first fiber Bragg Grating comprising a plurality of first patterns on the first end region, configured 360 degrees around a periphery of the first end region, and extending laterally along a length of the first end region and a second fiber Bragg Grating comprising a plurality of second patterns on the second end region, configured 360 degrees around a periphery of the second end region, and extending laterally along a length of the second end region.

In an example the system has a nanofiber region configured from a center portion of the fiber optic cable and coupled between the first end region and the second end region. The nanofiber region has a transmission of 95% and greater. The nanofiber region has a diameter ranging from 300 nanometer to 1.5 micrometer and others. The nanofiber region ranges from 10 micrometer to 10 centimeter in length, among others. The system has a first taper region configured from a first portion of the nanofiber region within a vicinity of the first fiber Bragg Grating and a second taper region configured from a second portion of the nanofiber region within a vicinity of the second fiber Bragg Grating.

In an example, the system has a cavity formed between the first fiber Bragg Grating and the second fiber Bragg Gratings including the taper regions and the nanofiber region. A plurality of atoms comprising an alkali metal atom, an alkaline-earth metal, an alkaline-earth-like atom or other laser coolable atoms such that a number of the atoms range from one to 100,000 are evanescently coupled to the nanofiber region between the first fiber Bragg grating and the second fiber Bragg grating. Further details of the present system and related methods can be found throughout the present specification and more particularly below.

Figure 5:
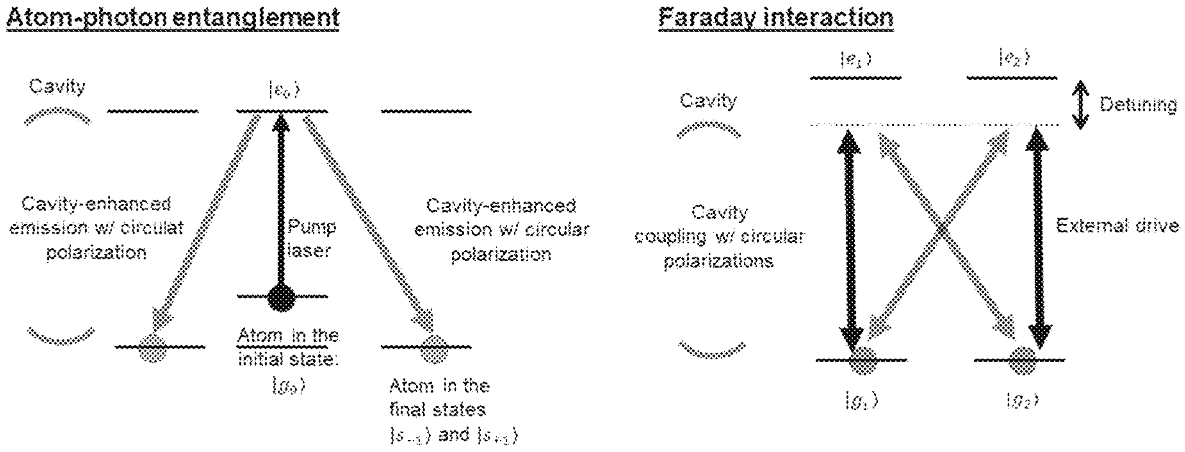
FIG. 5 is an exemplary diagram illustrating applications of using a circular polarized cavity mode for atom-photon entanglement and non-destructive imaging via polarization rotation in an example of the present invention.

FIG. 5 is an exemplary diagram illustrating applications of a polarization-degenerate cavity for atom-photon entanglement and non-destructive imaging via polarization rotation in an example of the present invention. Generating atom-photon entanglement typically involves the process of atom-photon interaction, where the quantum states of the atom and the photon become correlated or entangled. In this example, the atom-photon interaction is facilitated by the cavity where one or more of the atomic transitions is strongly coupled to the cavity modes such that the emitted single photon is efficiently coupled to the cavity mode and later extracted from the cavity for distributions of atom-photon entanglement.

An outline of generation of atom-photon entanglement is as follows: First, a single atom is initialized in a well-defined quantum state, typically the ground state or a specific excited state. This can be achieved using laser cooling and optical pumping techniques and/or other appropriate methods. Next, for one example of entanglement generation protocol, a single atom is coupled to an optical cavity mode and is pumped from its initial state to the excited by applying a laser. Subsequently, the excited atom preferentially emits a single photon into the cavity mode with both two orthogonal circular polarizations where rotations are right-handed and left-handed. As a result, the internal states of single atom and polarization states of single photon are entangled and the photon is efficiently extracted from the cavity for the later applications, including entanglement-based long-distance communication. This entanglement generation protocol requires the fact that the cavity mode supports the right-handed and left-handed circular polarizations with the same resonant frequencies that can be achieved by the present invention described above.

The second application is to generate Faraday interaction and its applications to engineering spin-spin interactions between a plurality of atoms. The Faraday interaction with a double lambda system refers to the interaction of light with a quantum system that exhibits a specific energy level structure known as a double lambda configuration. This configuration consists of two pairs of closely spaced energy levels, resembling the Greek letter "lambda." In a double lambda system, there are typically two ground states, e.g., denoted by |g1> and |g2> and two excited states |e1> and |e2>, in FIG. 5.

When a magnetic field is applied perpendicular to the direction of light propagation, the energy levels of the double lambda system undergo Zeeman splitting due to the interaction between the magnetic field and the atomic magnetic moments. This splitting leads to differences in the transition frequencies for right-and left-circularly polarized light. The Faraday effect comes into play when the double lambda system is illuminated by linearly polarized control light in the presence of a magnetic field. The magnetic field induces a differential phase shift between the two orthogonal components of the linearly polarized light due to the frequency difference caused by the Zeeman splitting. This phase shift results in the rotation of the plane of polarization of the transmitted or reflected light.

By analyzing the rotation of the polarization plane, one can extract information about the magnetic field strength or other relevant properties of the system. The Faraday interaction with a double lambda system is widely used in applications such as magnetometry, optical isolators, and quantum information processing.

Furthermore, the Faraday interactions can be applied to engineer effective spin-spin interactions which provides a tool for manipulating and controlling quantum systems and can enable the implementation of various quantum technologies. The spin-exchange interactions are generated by virtual photon exchange between atoms dispersively coupled to the cavity mode. The building block is a Raman process where an atom changes its internal state by absorbing a photon from a control field and emitting it into a cavity mode. When a control field is detuned from Raman resonance, virtual emission into the cavity can induce a spin "flip-flop" process, wherein a second atom flips its spin by absorbing the virtual photon in the cavity mode and re-scattering a real photon into the mode of the control field.

In an example, the present invention provides a method of manufacturing a polarization-degenerate fiber Bragg grating nanofiber cavity for quantum computing or quantum repeater. The method includes transmitting electromagnetic radiation characterized by a wavelength of 150 nm to 400 nm and longer through a pattern of a phase shift mask to diffract the electromagnetic radiation to form an interference pattern. The pattern is to be illuminated onto a core of a first end of a fiber optical cable region. The first end opposite of a second end, and a nanofiber cavity region defined between the first end and the second end.

In an example, the method includes causing a formation of a first fiber Bragg grating onto the core of fiber optical cable region by changing a refractive index of the core of fiber optical cable region using the electromagnetic radiation while rotating the fiber optical cable about an axis defined along a length of the fiber optical cable region to form the first fiber Bragg grating configured with a plurality of azimuthally symmetric patterns of a plurality of refractive index modulations 360 Degrees in angle around a core of the fiber optical cable and along a longitudinal region normal to a cross-section of the fiber optical cable region. The method includes forming a second fiber Bragg grating at a second end of the fiber optical cable region and the second fiber Bragg grating configured with a plurality of azimuthally symmetric patterns of a plurality of refractive index modulations 360 Degrees in angle around a core of the fiber optical cable. In an example, the second fiber Bragg grating is formed using similar radiation through the phase shift mask.

In an example, the nanofiber cavity configured with the first Bragg grating and the second Bragg grating is characterized by a polarization-degenerate cavity mode that is adapted to any arbitrary polarization states of light without causing one or more different resonant frequencies. In an example, the nanofiber cavity is characterized as a polarization degenerate fiber Bragg grating nanofiber cavity such that any arbitrary polarization states of light are free from any different resonant frequencies. In an example, the nanofiber cavity ranging from 100 micrometer to 1 cm and longer.

In an example, the first fiber Bragg grating or the second fiber Bragg grating characterized by the azimuthally symmetric patterns of refractive index modulations is configured by a modulation period along the fiber axis ranging from 200 nm to 1 micron in dimension, or others. In an example, the first fiber Bragg grating or the second fiber Bragg grating characterized by the azimuthally symmetric patterns of refractive index modulations has a cross section ranging from 1 micron to 10 microns and greater in dimension. In an example, the first fiber Bragg grating or the second fiber Bragg grating has a length ranging from 50 microns to 10 centimeters and above.

In an example, the electromagnetic radiation is characterized by an exposure time from 10 seconds to 100 minutes. In a preferred example, the exposure time is controlled by monitoring a peak reflectivity of either the first fiber Bragg grating or the second fiber Bragg grating in real time for a power of electromagnetic radiation from 10 mW to 1 W and a diameter of the electromagnetic radiation ranging from 30 microns to 1 mm.

In an example, the first fiber Bragg grating and the second fiber Bragg grating are each spatially disposed on a fiber optical cable with a spatial distance between first fiber Bragg grating and the second fiber Bragg grating, ranging from 100 microns to 10 cm and longer. In an example, the first fiber Bragg grating and the second fiber Bragg grating are configured on each side of a tapered region coupled to a nanofiber region. In an example, the first fiber Bragg grating and the second fiber Bragg grating are characterized by a plurality of patterns imprinted on a silicon dioxide material of the fiber optical cable region.

In an example, the rotation of the fiber along the fiber axis is characterized by a speed of rotation to cause formation of the azimuthal symmetric patterns of the refractive index modulation where a rotation speed is faster than an inverse of a UV exposure time such that a transversely anisotropic pattern of a refractive index modulation is averaged over a azimuthal direction.

In an alternative example, the present invention provides a method of manufacturing a polarization-degenerate fiber Bragg grating nanofiber cavity for quantum computing or repeater. In an example, the method includes providing a fiber optical cable comprising a first end, a second end, and a nanofiber region between the first end and the second end. The method includes transmitting electromagnetic radiation characterized by a wavelength of 150 nm to 400 nm and longer through phase shift mask to diffract the electromagnetic radiation to form an interference pattern to be illuminated onto a core of a first end of the fiber optical cable.

In an example, the method includes causing a formation of a first fiber Bragg grating onto the core of a first end of a fiber optical cable region by changing a refractive index of the core of fiber optical cable region using the electromagnetic radiation without rotating the fiber to create an additional spatial region of the fiber optical cable region such that first fiber Bragg granting has a plurality of azimuthally anisotropic patterns of a plurality of refractive index modulations around the core of the fiber optical cable and along a longitudinal region normal to a cross-section of the fiber optical cable region.

In an example, the method includes rotating the fiber optical cable about an axis (or rotating the light source) defined along a length of the fiber optical cable region by 90 degree in angle or other angle. The method includes forming a second fiber Bragg grating onto a core of a second end of the fiber optical cable without rotating the fiber such that the first fiber Bragg grating and the second fiber Bragg grating are characterized by respective transverse anisotropies of refractive index modulations shifted by 90 degrees in angle, causing a polarization degenerate cavity from a cancellation of transverse anisotropy.

In an example, the nanofiber region configured with the first Bragg grating and the second Bragg grating form a polarization degenerate fiber Bragg grating nanofiber cavity such that any arbitrary polarization states of light do not cause different resonant frequencies. In an example, the nanofiber region ranging from 100 micrometer to 1 cm and longer. In an example, the nanofiber region is characterized by a polarization-degenerate cavity mode adapted to support any arbitrary polarization states of light without causing different resonant frequencies or other differing properties. In an example, the first fiber Bragg grating is characterized by a birefringence and the second fiber Bragg grating is configured with a 90 degree offset angle along the axis such that one or more cavity modes formed by first fiber Bragg grating and the second fiber Bragg grating are polarization degenerate from a cancellation of the birefringence of the first fiber Bragg grating and the second fiber Bragg grating.

While the above is a full description of the specific examples, various modifications, alternative constructions, and equivalents may be used. As an example, the device can include any combination of elements described above, as well as outside of the present specification. Additionally, the terms first, second, third. and final do not imply order in one or more of the present examples. As used herein, the term "backside" and/or "frontside" does not mean any specific placement but are merely used in reference to other elements in the claim. Therefore, the above description and illustrations should not be taken as limiting the scope of the present invention which is defined by the appended claims.

REFERENCES

[1] S. Kato and T. Aoki, "Single-frequency fiber Fabry-Perot Brillouin laser", Opt. Lett. 47, 5000 (2022).

[2] Maxime Joos, Alberto Bramati, and Quentin Glorieux, "Complete polarization control for a nanofiber waveguide using the scattering properties", Opt. Lett. 27, 18818 (2019).

The invention claimed is:

1. A method of manufacturing a polarization-degenerate fiber Bragg grating nanofiber cavity for quantum computing or quantum repeater and providing the polarization degenerate fiber Bragg grating nanofiber cavity into a quantum computer or the quantum repeater, the method comprising:

providing a fiber optical cable having a fiber optical cable region;

transmitting electromagnetic radiation characterized by a wavelength of 150 nm to 400 nm and longer through a pattern of a phase shift mask to diffract the electromagnetic radiation to form an interference pattern to be illuminated onto a core of a first end of the fiber optical cable region, the fiber optical cable region having a first end opposite of a second end, and a nanofiber cavity region defined between the first end and the second end;

causing a formation of a first fiber Bragg grating onto the core of fiber optical cable region by changing a refractive index of the core of fiber optical cable region using the electromagnetic radiation while rotating the fiber optical cable region about an axis defined along a length of the fiber optical cable region to form the first fiber Bragg grating configured with a plurality of azimuthally symmetric patterns of a plurality of refractive index modulations 360 degrees in angle around a core of the fiber optical cable region and along a longitudinal region normal to a cross-section of the fiber optical cable region; and forming a second fiber Bragg grating at a second end of the fiber optical cable region and the second fiber Bragg grating configured with a plurality of azimuthally symmetric patterns of a plurality of refractive index modulations 360 degrees in angle around a core of the fiber optical cable region;

using the polarization degenerate fiber Bragg grating nanofiber cavity as a cavity in the quantum computer or the quantum repeater; and performing the rotating of the fiber optical cable region at a speed of rotation faster than an inverse of an exposure time of the electromagnetic radiation such that a transversely anisotropic pattern of the refractive index modulation is averaged over an azimuthal direction to form the first fiber Bragg grating and the second fiber Bragg grating as birefringence-free gratings that form a polarization-degenerate cavity such that the polarization-degenerate cavity being characterized by a cavity mode adapted to any arbitrary polarization states of light without causing one or more different resonant frequencies.

2. The method of claim 1 wherein the nanofiber cavity region configured with the first Bragg grating and the second Bragg grating is characterized by a polarization-degenerate cavity mode that is adapted to any arbitrary polarization states of light without causing one or more different resonant frequencies.

3. The method of claim 1 wherein the nanofiber cavity region is characterized as a polarization degenerate fiber Bragg grating nanofiber cavity such that any arbitrary polarization states of light are free from any different resonant frequencies.

4. The method of claim 1 wherein the nanofiber cavity region ranging from 100 micrometer to 1 centimeter and longer.

5. The method of claim 1 wherein the first fiber Bragg grating or the second fiber Bragg grating characterized by the azimuthally symmetric patterns of refractive index modulations is configured by a modulation period along the fiber axis ranging from 200 nm to 1 micron in dimension.

6. The method of claim 1 wherein the first fiber Bragg grating or the second fiber Bragg grating characterized by the azimuthally symmetric patterns of refractive index modulations has a cross section ranging from 1 micrometer to 10 micrometers and greater in dimension.

7. The method of claim 1 wherein the first fiber Bragg grating or the second fiber Bragg grating has a length ranging from 50 micrometers to 10 centimeters and above.

8. The method of claim 1 wherein the electromagnetic radiation is characterized by an exposure time from 10 seconds to 100 minutes, the exposure time being controlled by monitoring a peak reflectivity of either the first fiber Bragg grating or the second fiber Bragg grating in real time for a power of electromagnetic radiation from 10 mW to 1 W and a diameter of the electromagnetic radiation ranging from 3 micrometers to 1 mm.

9. The method of claim 1 wherein the first fiber Bragg grating and the second fiber Bragg grating are each spatially disposed on a fiber optical cable region with a spatial distance between first fiber Bragg grating and the second fiber Bragg grating, ranging from 100 micrometers to 10 centimeter and longer.

10. The method of claim 1 wherein the first fiber Bragg grating and the second fiber Bragg grating are configured on each side of a tapered region coupled to a nanofiber region.

11. The method of claim 1 wherein the first fiber Bragg grating and the second fiber Bragg grating are characterized by a plurality of patterns imprinted on a silicon dioxide material of the fiber optical cable region.

12. The method of claim 1 wherein rotation of the fiber along the fiber axis is characterized by a speed of rotation to cause formation of the azimuthal symmetric patterns of the refractive index modulation where a rotation speed is faster than an inverse of a UV exposure time such that a transversely anisotropic pattern of a refractive index modulation is averaged over an azimuthal direction.

* * * * *